(12) United States Patent
Prasad et al.

(10) Patent No.: US 10,127,142 B2
(45) Date of Patent: Nov. 13, 2018

(54) DEFECT CLASSIFICATION AND ASSOCIATION IN A SOFTWARE DEVELOPMENT ENVIRONMENT

(71) Applicant: HCL TECHNOLOGIES LTD., Chennai (IN)

(72) Inventors: Dhanyamraju S U M Prasad, Hyderabad (IN); Satya Sai Prakash K, Hyderabad (IN); Simy Chacko, Hyderabad (IN); Sekhar Ramaraju, Secunderabad (IN); Sankar Pabba, Warangal (IN)

(73) Assignee: HCL TECHNOLOGIES LTD., Chennai, Tamil Nadu (IN)

( * ) Notice: Subject to any disclaimer, the term of this patent is extended or adjusted under 35 U.S.C. 154(b) by 0 days.

(21) Appl. No.: 14/510,114

(22) Filed: Oct. 9, 2014

(65) Prior Publication Data

US 2015/0378874 A1 Dec. 31, 2015

(51) Int. Cl.
*G06F 11/36* (2006.01)

(52) U.S. Cl.
CPC ...... *G06F 11/3676* (2013.01); *G06F 11/3692* (2013.01)

(58) Field of Classification Search
CPC ........................................ G06F 11/36–11/3696
See application file for complete search history.

(56) References Cited

U.S. PATENT DOCUMENTS

| | | | |
|---|---|---|---|
| 2005/0120273 A1* | 6/2005 | Hudson et al. | 714/38 |
| 2006/0123389 A1* | 6/2006 | Kolawa et al. | 717/101 |
| 2006/0265188 A1* | 11/2006 | French | G06F 11/3676 702/185 |
| 2009/0171893 A1* | 7/2009 | Gonzales et al. | 707/3 |
| 2011/0066558 A1* | 3/2011 | Bassin et al. | 705/301 |

(Continued)

OTHER PUBLICATIONS

Srikanth, Henna, Laurie Williams, and Jason Osborne. "System test case prioritization of new and regression test cases." Empirical Software Engineering, 2005. 2005 International Symposium on. IEEE. (Year: 2005).*

(Continued)

*Primary Examiner* — Chameli Das
*Assistant Examiner* — Joanne G Macasiano
(74) *Attorney, Agent, or Firm* — Mannava & Kang, P.C.; Vinay Malik (57) ABSTRACT

Defect classification and association in a software development environment. The embodiments herein relates to a software development environment, and more particularly to managing defects in a software development environment. The defect management engine may use information present in the code repository to create a master list of features and/or sub-features. Using the master list, the defect management engine may scan and parse all reported defects (which may be present in the defect repository). The defect management engine may associate defects with features present in the master list. The defect management engine may then extract the test cases and map the test cases to the defects. The defect management engine may determine the test coverage metric and the test case sufficiency metric. The defect management engine may also label unmapped defects as orphan defects.

4 Claims, 5 Drawing Sheets

(56) References Cited

U.S. PATENT DOCUMENTS

2014/0282406 A1* 9/2014 Narasimhan et al. ........ 717/124
2015/0082277 A1* 3/2015 Champlin-Scharff et al. ..............
                                                    717/120

OTHER PUBLICATIONS

Elberzhager, Frank, et al. "Reducing test effort: A systematic mapping study on existing approaches." Information and Software Technology 54.10 (2012): 1092-1106 (Year: 2012).*

* cited by examiner

DEFECT CLASSIFICATION AND ASSOCIATION IN A SOFTWARE DEVELOPMENT ENVIRONMENT

The present application is based on, and claims priority from, Indian Complete Application number 3114/CHE/2014 filed on 26, Jun. 2014, the disclosure of which is hereby incorporated by reference herein.

TECHNICAL FIELD

The embodiments herein relate to a software development environment, and more particularly to managing defects in a software development environment.

BACKGROUND

The software development lifecycle typically comprises of four distinct phases—requirement collection, design, coding and testing. Testing is the phase where the code of a software product is tested for defects. The defects, if any, may be fixed and retested before releasing the software product. However, testing may not detect all the defects present in the software and there may be defects present within the software product. Two major causes of this may be insufficiency in the test cases and insufficiency in test coverage, and understanding gaps among the persons performing the testing, tester errors and so on.

This may cause issues to both the organization developing the product and the users. These issues may be in terms of customer satisfaction, monetary losses to organizations and so on. Also, fixing defects is a costly and time consuming task as it requires multiple teams (support, development, testing teams and so on) to come together and resolve the defect.

SUMMARY

Accordingly the embodiments herein provides a method for managing defects in a software development environment, the method comprising of creating a master list of features by a defect management engine using information fetched from a code repository; mapping defects to most probable feature from the master list by the defect management engine, wherein the defects are fetched from a defect repository; mapping test cases to the defects by the defect management engine; labeling unmapped defects as orphan defects by the defect management engine; labeling mapped defects as mapped defects by the defect management engine; calculating test coverage metric by the defect management engine as Test Coverage metric=(Number of Test Cases Executed/Total number of Test Cases)*100;

and
calculating test case sufficiency metric by the defect management engine as

Test Case Sufficiency={1−(Number of mapped defects for a feature/total defects)}*100

Also, provided herein is a computer program product comprising computer executable program code recorded on a computer readable non-transitory storage medium, said computer executable program code when executed, causing a method for managing defects in a software development environment comprising creating a master list of features using information fetched from a code repository; mapping defects to most probable feature from the master list, wherein the defects are fetched from a defect repository; mapping test cases to the defects; labeling unmapped defects as orphan defects; labeling mapped defects as mapped defects; calculating test coverage metric as Test Coverage metric=(Number of Test Cases Executed/Total number of Test Cases)*100;

and
calculating test case sufficiency metric as

Test Case Sufficiency={1−(Number of mapped defects for a feature/total defects)}*100

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

The embodiments herein are illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein propose a method and system for managing defects in a software development environment Referring now to the drawings, and more particularly to FIGS. 1 through 4, where similar reference characters denote corresponding features consistently throughout the figures, there are shown preferred embodiments.

Figure 1:
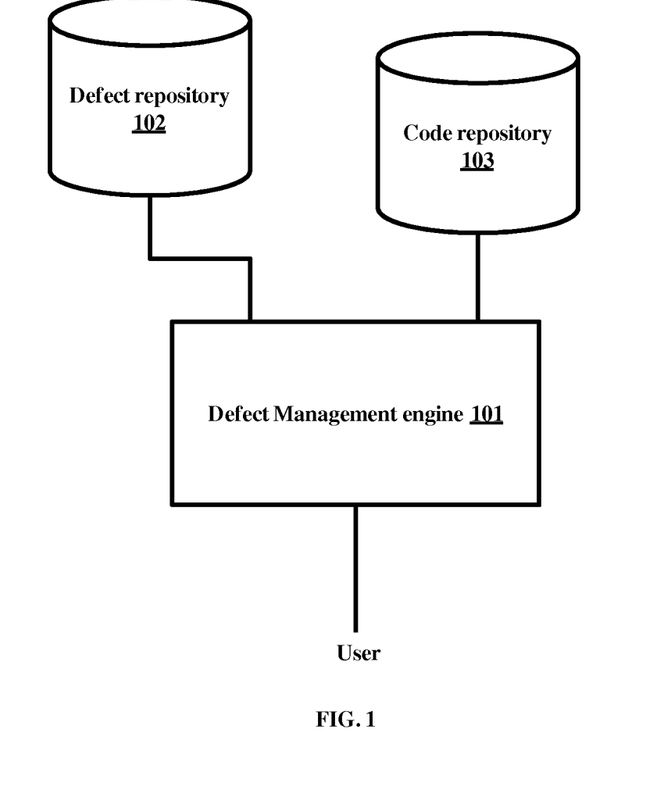
FIG. 1 depicts a system for managing defects, according to embodiments as disclosed herein.

FIG. 1 depicts a system for managing defects, according to embodiments as disclosed herein. The system, as depicted comprises of a defect management engine 101 connected to at least one defect repository 102 and at least one code repository 103. The defect repository 102 may comprise of defects/bugs/issues reported to an organization to which the repository 102 belongs, defects/bugs/issues reported to an organization who provides support to the same software/similar software and so on, defects/bugs/issues reported in publicly available repositories (such as the internet) and so on. The code repository 103 comprises of software code, design documentation, requirement documentation, scope documentation, test cases, a list of features and so on. The defect management engine 101 may be connected to the repositories 102, 103 using a network such as a Local Area Network (LAN), Wide Area Network (WAN), the internet and so on.

The defect management engine 101 may be connected to at least one user. The user may be a person authorized to access the defect management engine 101 such as a test manager, a development manager and so on.

The defect management engine 101 may use information present in the code repository 103 to create a master list of features and/or sub-features. Using the master list, the defect management engine 101 may scan and parse all reported defects (which may be present in the defect repository 102). The defect management engine 101 may associate defects with features present in the master list. The defect management engine 101 may then extract the test cases and map the test cases to the defects. The defect management engine 101 may determine the test coverage metric and the test case sufficiency metric. The defect management engine 101 may also label unmapped defects as orphan defects.

The terms 'bug', 'issue' and 'defect' have been used interchangeably herein and all the fore mentioned terms may indicate a defect in the software product.

The software product as disclosed herein may be a software product designed to run on a computing device (such as a computer, laptop, tablet, mobile phone and so on), embedded software or any other product which comprises of at least one line of software code.

Figure 2:
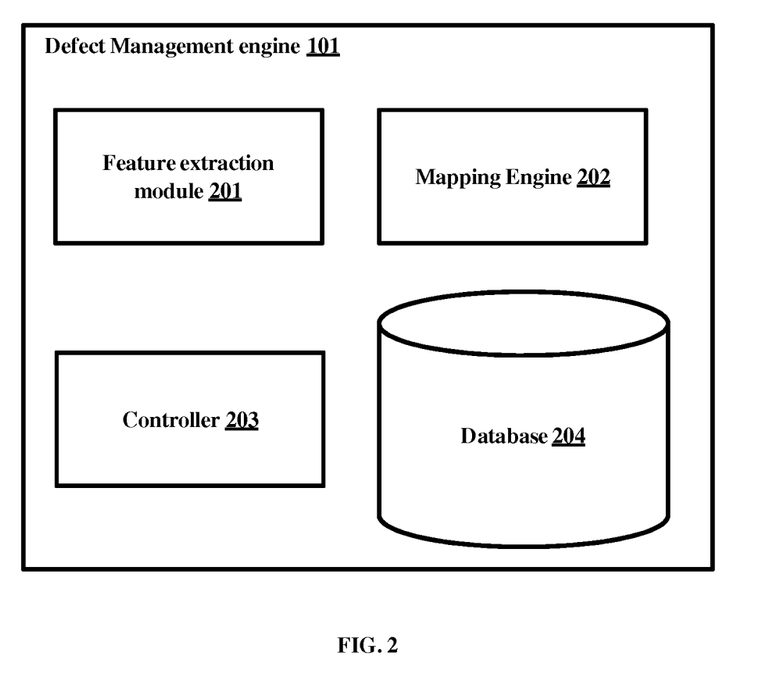
FIG. 2 depicts the defect management system, according to embodiments as disclosed herein.

FIG. 2 depicts the defect management system, according to embodiments as disclosed herein. The defect management engine 101, as depicted comprises of a feature extraction module 201, a mapping engine 202, a controller 203 and at least one database 204. The database 204 may be used for storing data. The database 204 may be co-located with the defect management engine 101. The database 204 may be located remotely from the defect management engine 101 and connected to the defect management engine 101 using a suitable connection means.

The feature extraction module 201 may fetch information present in the defect repository 102 and the code repository 103. The feature extraction module 201 may check if features are explicitly mentioned in the fetched data. If the features are mentioned explicitly, the feature extraction module 201 may extract the features. If the features are not mentioned explicitly, the feature extraction module 201 may perform techniques such as unsupervised extraction, clustering and inference algorithms to extract the features. Based on the extracted features, the feature extraction module 201 may parse the test cases (fetched from the code repository 103). Using the parsed test cases, the feature extraction module 201 may create a master list, wherein the master list comprises of features and/or sub-features. The feature extraction module 201 may further scan and parse the fetched defects.

The mapping engine 202 may map the scanned and parsed defects to the most probable features corresponding to the defects, wherein the features may be fetched from the master list. The mapping engine 202 may use suitable techniques such as distance and relevance metrics to perform the mapping. The mapping engine 202 may fetch the test cases corresponding to the mapped features. The mapping engine 202 may map the fetched test cases to the defects.

The controller 203, on receiving mapped defects and test cases from the mapping engine 202, may check if any defects are unmapped. On detecting any unmapped defects, the controller 203 may label the unmapped defects as orphan defects. If the defect is a mapped defect, the controller 203 may label the defect as a mapped defect. The controller 203 may further calculate the test coverage metric. The controller 203 may calculate the test coverage metric as the ratio of test cases executed to total number of test cases which may be measured against the complete test suite. The controller 203 may determine the test coverage metric as Test Coverage metric=(Number of Test Cases Executed/Total number of Test Cases)*100

Consider an example, where 200 test cases got executed from the total list of 600 test cases for a software product release, then the controller 203 calculates the test coverage as test coverage metric=(200/600)*100=33.3%

The controller 203 may validate the test coverage metric. The controller 203 may validate the test coverage metric by determining the ratio of orphan defects in terms of percentage as Orphan Defect Ratio=(Number of orphan defects/Total number of defects)*100

Considering the above example, consider that after the release of the software product 300 defects have been reported. Of the 300 defects reported, consider that the controller 203 determines that 75 defects of the reported defects are orphan defects.

Orphan defect ratio=(75/300)*100=25%,

A ratio of 25% implies that the test coverage has been poor.

The controller 203 further determines the test case sufficiency metric. The test case sufficiency metric is an individual metric pertinent to each test case and its sufficiency to detect bugs as per the expected functionality/behavior. The controller 203 may determine the test case sufficiency from the mapped defects. As these defects are mapped with some feature or the other that is corresponding to one more test cases, Test Case Sufficiency={1=(Number of mapped defects for a feature/total defects)}*100

Continuing the above example, consider that out of 225 feature mapped defects, 30 defects correspond to feature A related to test case T1, then the test case sufficiency of T1 is determined as Test case sufficiency (T1)=((1=(30/300))*100)=90%

The controller 203 may store the master list, the mapped defects, features and test cases, the orphan defect ratio, the test coverage metric and the test case sufficiency in a suitable location such as the database 204. The controller 203 may make the above mentioned information available to at least one user. The controller 203 may make the information available through at least one of an email, a document, a user interface and so on. The controller 203 may enable the user to modify, when he would receive the information, the format in which he receives the information (tabular information, charts, graphs and so on) and so on. The user may access the information using a suitable means such as a mobile phone, a tablet, a laptop, a computer and so on.

Figure 3A:
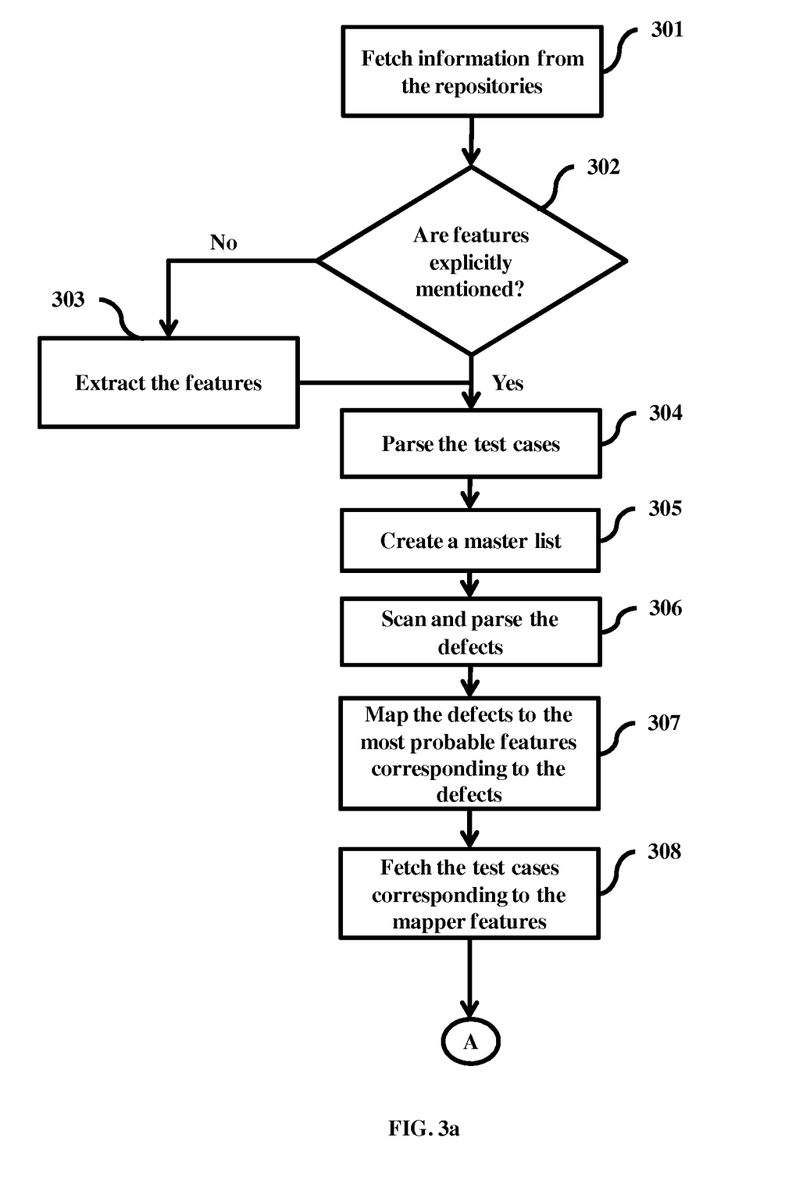
FIGS. 3a and 3b are flowcharts illustrating the process of managing defects, according to embodiments as disclosed herein.
Figure 3B:
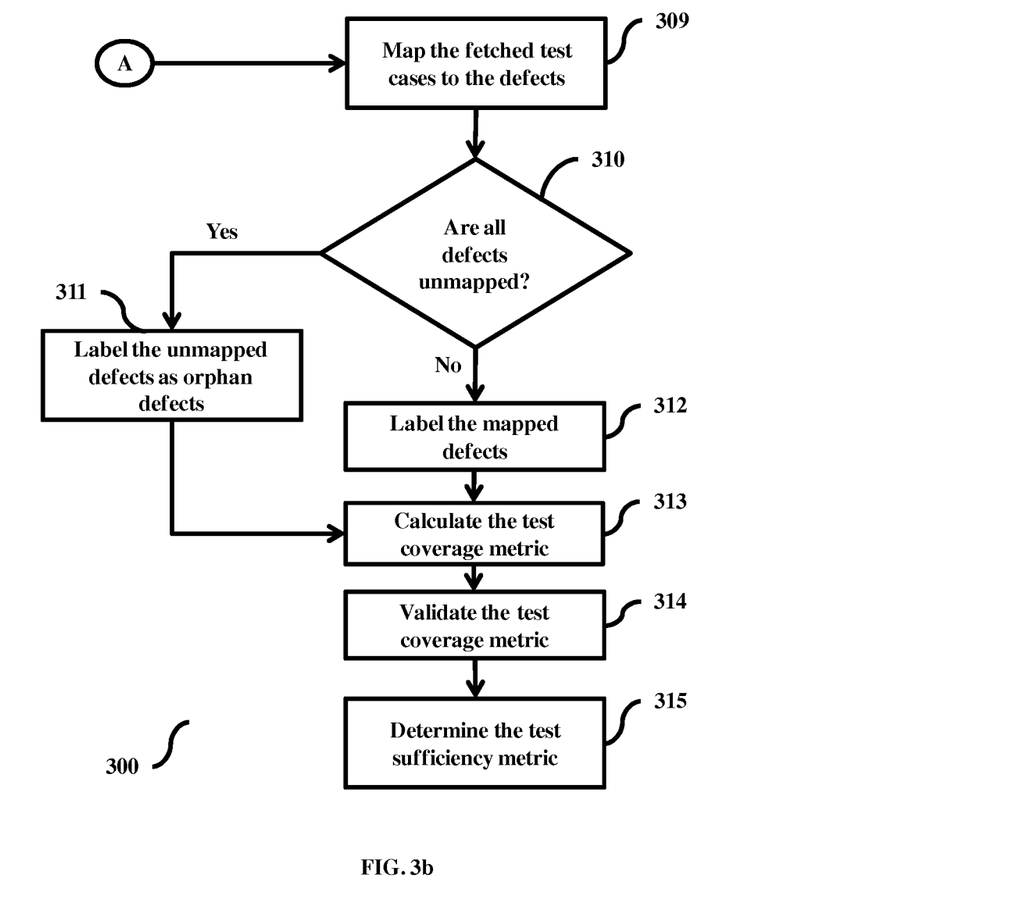

FIGS. 3a and 3b are flowcharts illustrating the process of managing defects, according to embodiments as disclosed herein. The defect management engine 101 fetches (301) information present in the defect repository 102 and the code repository 103. The defect management engine 101 checks (302) if features are explicitly mentioned in the fetched data. If the features are not mentioned explicitly, the defect management engine 101 extracts (303) the features using suitable techniques such as unsupervised extraction, clustering and inference algorithms and so on. Based on the extracted features, the defect management engine 101 parses (304) the test cases (fetched from the code repository 103). Using the parsed test cases, the defect management engine 101 creates (305) a master list, wherein the master list comprises of features and/or sub-features. The defect management engine 101 further scans and parses (306) the fetched defects. The defect management engine 101 maps (307) the scanned and parsed defects to the most probable features corresponding to the defects, wherein the features may be fetched from the master list. The defect management engine 101 uses suitable techniques such as distance and relevance metrics to perform the mapping. The defect management engine 101 fetches (308) the test cases corresponding to the mapped features. The defect management engine 101 maps (309) the fetched test cases to the defects. The defect management engine 101 further checks (310) if any defects are unmapped. On detecting any unmapped defects, the defect management engine 101 labels (311) the unmapped defects as orphan defects. If the defect is a mapped defect, the defect management engine 101 labels (312) the defect as a mapped defect. The defect management engine 101 further calculates (313) the test coverage metric. The defect management engine 101 calculates the test coverage metric as the ratio of test cases executed to total number of test cases which may be measured against the complete test suite. The defect management engine 101 determines the test coverage metric as Test Coverage metric=(Number of Test Cases Executed/Total number of Test Cases)*100

The defect management engine 101 validates (314) the test coverage metric. The defect management engine 101 validates the test coverage metric by determining the ratio of orphan defects in terms of percentage as Orphan Defect Ratio=(Number of orphan defects/ Total number of defects)*100

The defect management engine 101 further determines (315) the test case sufficiency metric. The test case sufficiency metric is an individual metric pertinent to each test case and its sufficiency to detect bugs as per the expected functionality/behavior. The defect management engine 101 determines the test case sufficiency from the mapped defects. As these defects are mapped with some feature or the other that is corresponding to one more test cases, Test Case Sufficiency={1=(Number of mapped defects for a feature/total defects)}*100

The various actions in method 300 may be performed in the order presented, in a different order or simultaneously. Further, in some embodiments, some actions listed in FIGS. 3a and 3b may be omitted.

Figure 4:
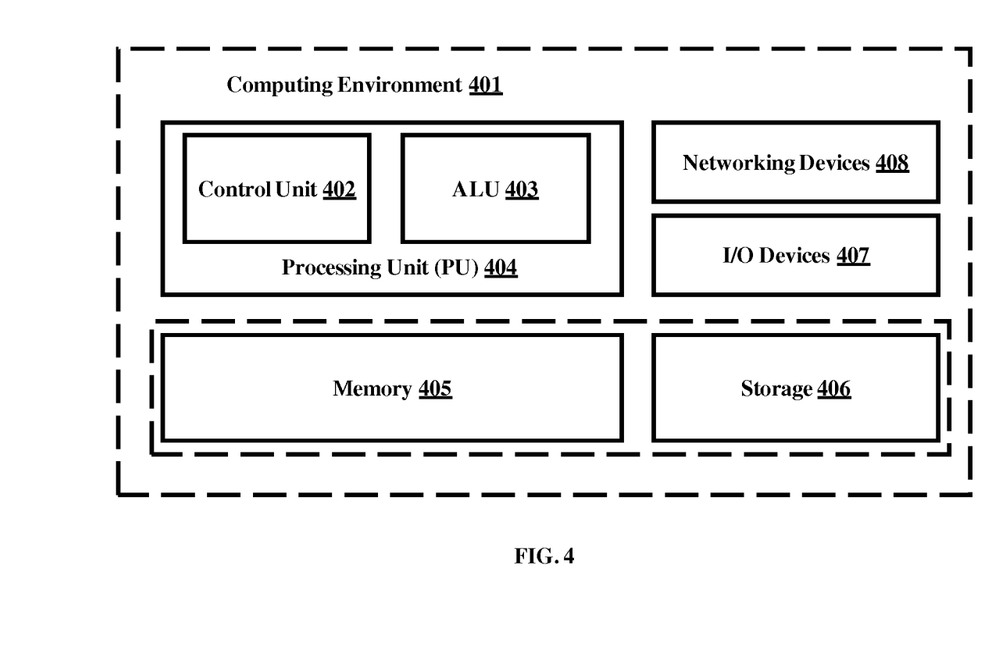
FIG. 4 illustrates a computing environment implementing the method for managing defects in a software development environment, according to embodiments as disclosed herein.

FIG. 4 illustrates a computing environment implementing the method for managing defects in a software development environment, according to embodiments as disclosed herein.

As depicted the computing environment 501 comprises at least one processing unit 404 that is equipped with a control unit 402 and an Arithmetic Logic Unit (ALU) 403, a memory 405, a storage unit 406, plurality of networking devices 408 and a plurality Input output (I/O) devices 407. The processing unit 404 is responsible for processing the instructions of the algorithm. The processing unit 404 receives commands from the control unit in order to perform its processing. Further, any logical and arithmetic operations involved in the execution of the instructions are computed with the help of the ALU 403.

The overall computing environment 401 can be composed of multiple homogeneous and/or heterogeneous cores, multiple CPUs of different kinds, special media and other accelerators. The processing unit 404 is responsible for processing the instructions of the algorithm. Further, the plurality of processing units 404 may be located on a single chip or over multiple chips.

The algorithm comprising of instructions and codes required for the implementation are stored in either the memory unit 405 or the storage 406 or both. At the time of execution, the instructions may be fetched from the corresponding memory 405 and/or storage 406, and executed by the processing unit 404.

In case of any hardware implementations various networking devices 408 or external I/O devices 407 may be connected to the computing environment to support the implementation through the networking unit and the I/O device unit.

Embodiments disclosed herein are based on the premise and domain of actual bug repositories such as bugzilla. Embodiments disclosed herein make extensive use of text/ feature extraction algorithms (standard as well as customized) and use thus extracted features to map various defects to functional features and/or test cases.

Embodiments disclosed herein enable software development organizations to differentiate the root cause for the defects. Embodiments disclosed herein enable software development organizations to obtain qualitative as well as quantitative metrics on test coverage as well as test case sufficiency. Embodiments disclosed herein enable software development organizations to localize the related code for further fix based on the extracted features. Embodiments disclosed herein enable software development organizations to nail down to a narrow test suite based on the functionality of features thus found based on feature defect mapping.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for managing defects in a software development environment, the method comprising:
   extracting, by a processing unit, at least one feature from a code repository, wherein, the at least one feature is extracted from information of the code repository using at least one of an unsupervised technique, a clustering technique and an inference technique in response to determining the at least one feature is not explicitly present in the code repository;

parsing, by the processing unit, at least one test case based on the extracted feature to create a master list, wherein the master list comprises features and sub features, wherein the at least one test case is present in the code repository;

determining, by the processing unit, at least one defect generated from the at least one parsed test case;

mapping, by the processing unit, the at least one defect to a most probable feature from the master list, wherein the at least one defects is are fetched from a defect repository, wherein the mapping is performed using distance and relevance metrics;

mapping, by the processing unit, the at least one test cases to the at least one defect, wherein the at least one test case is associated with the at least one probable feature;

labeling, by the processing unit, unmapped defects as orphan defects, wherein the orphan defects represent at least one defect that is not mapped with the features and sub-features of the master list and the at least one test case;

labeling, by the processing unit, mapped defects as mapped defects;

calculating, by an Arithmetic Logic Unit (ALU) equipped with the processing unit, a test coverage metric as Test Coverage metric=(Number of test cases executed/Total number of Test cases)*100;

validating, by the processing unit, the test coverage metric in conjunction with an orphan defect ratio, wherein the orphan defect ratio is determined, by the ALU, as Orphan defect Ratio=(Number of orphan defects/Total number of defects)*100;

calculating, by the ALU, a test case sufficiency metric from the at least one defect mapped to the at least one test case, wherein the test case sufficiency metric is calculated as Test Case Sufficiency={1−(Number of mapped defects for a feature/total defects)}*100, wherein the test case sufficiency indicates an individual metric pertinent to each test case and relative sufficiency to detect the defects as per an expected functionality; and utilizing, by the processing unit, the test coverage metric and the test case sufficiency metric for managing the defects and differentiating root cause for the defects in the software development environment.

2. The method as claimed in claim 1, wherein the information fetched from the code repository to extract the at least one feature includes at least one of a software code, a design documentation, a requirement documentation, a scope documentation and a test case.

3. A computer program product comprising computer executable program code recorded on a computer readable non-transitory storage medium, said computer executable program code when executed, causing a method for managing defects in a software development environment comprising:

extracting at least one feature from a code repository, wherein, the at least one feature is extracted from information of the code repository using at least one of a unsupervised technique, a clustering technique and an inference algorithm in response to determining the at least one feature is not explicitly present in the code repository;

parsing at least one test case based on the extracted feature to create a master list, wherein the master list comprises features and sub features, wherein the at least one test case is present in the code repository;

determining at least one defect generated from the at least one parsed test case;

mapping the at least one defect to a most probable feature from the master list, wherein the at least one defect is fetched from a defect repository, wherein the mapping is performed using distance and relevance metrics;

mapping the at least one test cases to the at least one defect; wherein the at least one test case is associated with the at least one probable feature;

labelling unmapped defects as orphan defects, wherein the orphan defects represent at least one defect that is not mapped with the features and sub-features of the master list and the at least one test case;

labelling mapped defects as mapped defects;

calculating a test coverage metric as

Test Coverage metric=(Number of test cases executed/Total number of Test cases)*100;

validating the test coverage metric in conjunction with an orphan defect ratio, wherein the orphan defect ratio is determined as Orphan defect Ratio=(Number of orphan defects/Total number of defects)*100;

calculating a test case sufficiency metric from the at least one defect mapped to the at least one test case, wherein the test case sufficiency metric is calculated as Test Case Sufficiency={1−(Number of mapped defects for a feature/total defects)}*100, wherein the test case sufficiency indicates an individual metric pertinent to each test case and relative sufficiency to detect the defects as per an expected functionality; and utilizing the test coverage metric and the test case sufficiency metric for managing the defects and differentiating root cause for the defects in the software development environment.

4. The computer program product as claimed in claim 3, wherein the information fetched from the code repository to extract the at least one feature includes at least one of a software code, a design documentation, a requirement documentation, a scope documentation and a test case.

* * * * *